US011176003B2

(12) United States Patent
Brown et al.

(10) Patent No.: US 11,176,003 B2
(45) Date of Patent: *Nov. 16, 2021

(54) RESTORATION OF DATA WHEN POINT IN TIME COPY OPERATIONS ARE PERFORMED DURING ASYNCHRONOUS COPY

(71) Applicant: INTERNATIONAL BUSINESS MACHINES CORPORATION, Armonk, NY (US)

(72) Inventors: Theresa M. Brown, Tucson, AZ (US); Nicolas M. Clayton, Warrington (GB); Nedlaya Y. Francisco, Tucson, AZ (US); Theodore T. Harris, Jr., Tucson, AZ (US); Kevin Lin, Tucson, AZ (US); Gregory E. McBride, Vail, AZ (US); Carol S. Mellgren, Tucson, AZ (US); Raul E. Saba, Tucson, AZ (US); Matthew Sanchez, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 258 days.

This patent is subject to a terminal disclaimer.

(21) Appl. No.: 16/440,926

(22) Filed: Jun. 13, 2019

(65) Prior Publication Data
US 2019/0294511 A1 Sep. 26, 2019

Related U.S. Application Data

(63) Continuation of application No. 15/662,144, filed on Jul. 27, 2017, now Pat. No. 10,360,112.

(51) Int. Cl.
*G06F 11/00* (2006.01)
*G06F 11/14* (2006.01)
*G06F 11/20* (2006.01)

(52) U.S. Cl.
CPC ...... *G06F 11/1469* (2013.01); *G06F 11/1446* (2013.01); *G06F 11/1451* (2013.01);
(Continued)

(58) Field of Classification Search
CPC ............ G06F 11/1446; G06F 11/1448; G06F 11/1451; G06F 11/1458; G06F 11/1464;
(Continued)

(56) References Cited

U.S. PATENT DOCUMENTS 6,353,878 B1 3/2002 Dunham
7,278,049 B2 10/2007 Bartfai et al.
(Continued)

OTHER PUBLICATIONS

C. Burger, "Global Copy, Metro Mirror, Global Mirror, and Metro/Global Mirror Overview", IBM Corporation, IBM Systems & Technology Group, 2004, p. 71.
(Continued)

*Primary Examiner* — Marc Duncan
(74) *Attorney, Agent, or Firm* — Konrad Raynes Davda & Victor LLP; Rabindranath Dutta

(57) ABSTRACT

Consistency groups are asynchronously copied to a remote computational device, from a local computational device, wherein point in time copy operations are performed at the local computational device while the consistency groups are being asynchronously copied to the remote computational device. Indicators are stored at the remote computational device to identify those point in time copy operations that are to be restored as part of a recovery operation performed at the remote computational device in response to a failure of the local computational device.

20 Claims, 9 Drawing Sheets

(52) U.S. Cl.
CPC ...... *G06F 11/1464* (2013.01); *G06F 11/2064* (2013.01); *G06F 11/2074* (2013.01); *G06F 2201/805* (2013.01); *G06F 2201/82* (2013.01); *G06F 2201/84* (2013.01)

(58) Field of Classification Search
CPC ............. G06F 11/1469; G06F 11/2074; G06F 2201/82; G06F 2201/84
See application file for complete search history.

(56) References Cited

U.S. PATENT DOCUMENTS

| | | | |
|---|---|---|---|
| 7,308,545 B1 * | 12/2007 | Kekre | G06F 11/2097 707/999.202 |
| 7,610,318 B2 | 10/2009 | Bartfai et al. | |
| 8,086,569 B2 | 12/2011 | Jasrasaria | |
| 9,378,219 B1 | 6/2016 | Bono et al. | |
| 10,360,112 B2 * | 7/2019 | Brown | G06F 11/2074 |
| 2015/0248434 A1 | 9/2015 | Avati et al. | |
| 2019/0034293 A1 | 1/2019 | Brown et al. | |

OTHER PUBLICATIONS

D. Clitherow, et al., "IBM GDPS Family An Introduction to Concepts and Capabilities", IBM Corporation, Document No. SG24-6374-11, Jul. 2016, p. 406.

"I/O Priority Management for Copy Services Relationships", IP.com, IP.com Prior Art Database Technical Disclosure, IP.com No. IPCOM000198983D, Aug. 19, 2010, p. 5.

"A method to mirror host new modified data with minimum storage space for remote copy suspension", IP.com, IP.com Prior Art Database Technical Disclosure, IP.com No. IPCOM000235428D, Feb. 27, 2014, p. 6.

Notice of Allowance for U.S. Appl. No. 15/662,144, dated Mar. 14, 2019, 13 pp., [18.72001 (NOA)].

List of IBM Patents or Patent Applications Treated as Related, Jun. 13, 2019, 2 pp. [18.720C1 (Appendix P)].

* cited by examiner

US 11,176,003 B2

RESTORATION OF DATA WHEN POINT IN TIME COPY OPERATIONS ARE PERFORMED DURING ASYNCHRONOUS COPY

CROSS-REFERENCE TO RELATED APPLICATION

This application is a continuation of U.S. patent application Ser. No. 15/662,144, filed Jul. 27, 2017, which application is incorporated herein by reference in its entirety.

BACKGROUND

1. Field

Embodiments relate to the restoration of data when point in time copy operations are performed during an asynchronous copy.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. The copying of a data set from a source volume to a target volume may be performed synchronously or asynchronously. In synchronous copy unless an acknowledgement is received that the data set has been written to the target volume, the host waits for the synchronous copy operation initiated by the host to complete, whereas in asynchronous copy the host does not have to wait for the asynchronous copy operation initiated by the host to complete.

Point in time copy allows creation of instantaneous, point in time snapshot copies of entire logical volumes or data sets. A point in time copy may involve physically copying all the data from source volumes to target volumes so that the target volume has a copy of the data as of a point in time. A point in time copy can also be made by logically making a copy of the data and then only copying data over when necessary.

When an application has one write that is dependent on the completion of another write, the application is said to have dependent writes. Using dependent writes, applications may manage the consistency of their data, so that a consistent state of the application data on storage devices is maintained, in the event of a failure in the host or the storage controller.

To maintain the consistency of data across multiple storage volumes at a remote backup location, certain storage controllers support the concept of a consistency group. Storage volumes in a copy relationship that are configured into a consistency group are maintained to ensure that a group of dependent updates made to the storage volumes at the primary location are made together as a unit on the storage volumes at the remote backup location to maintain data consistency.

Asynchronous remote copy is a mechanism that provides data replication over extended distances between two sites for business continuity, disaster recovery, and for other reasons. Asynchronous remote copy replicates the data asynchronously from a local site (e.g., a primary location) to a remote site.

FlashCopy* (FLC) is a type of point in time copy in which nearly instantaneous point in time snapshot copies of entire logical volumes or data sets may be created, and Global Mirror* (GM) provides data replication over extended distances via asynchronous copying with recovery point objectives (RPO) of as low as 3-5 seconds or less. Further details of Global Mirror may be found in the publication "IBM GDPS Family: An Introduction to Concepts and Capabilities", published July 2016, by International Business Machines Corporation.

*FlashCopy and Global Mirror are trademarks or registered trademarks of International Business Machines Corporation registered in many jurisdictions worldwide.

SUMMARY OF THE PREFERRED EMBODIMENTS

Provided are a method, system, and computer program product in which consistency groups are asynchronously copied to a remote computational device, from a local computational device, wherein point in time copy operations are performed at the local computational device while the consistency groups are being asynchronously copied to the remote computational device. Indicators are stored at the remote computational device to identify those point in time copy operations that are to be restored as part of a recovery operation performed at the remote computational device in response to a failure of the local computational device.

In certain embodiments, each of the indicators is a pending consistency group indicator. Creation of a point in time copy relationship is initiated at the local computational device while formation of a consistency group is in progress at the local computational device. An indication is made that the point in time copy relationship is not part of a consistent copy at the remote computational device as yet by enabling the pending consistency group indicator at the remote computational device for the point in time copy relationship.

In further embodiments, a determination is made as to whether the consistency group has been copied to the remote computational device. In response to determining that the consistency group has been copied to the remote computational device, the pending consistency group indicator is disabled.

In yet further embodiments, in response to determining the local computational device has become non-operational, the recovery operation in the remote computational device is initiated. The recovery operation determines which of a plurality of point in time copy relationships have corresponding pending consistency group indicators enabled.

In certain embodiments, the point in time copy relationships are withdrawn for those point in time copy relationships for which consistency group indicators are enabled. The performing the point in time copy relationships that are withdrawn is avoided while recovering the remote computational device to a known state.

In additional embodiments, a waiting is performed for physical copy to complete for those point in time copy relationships for which consistency group indicators are disabled. The point in time copy relationships are restored while recovering the remote computational device to a known state.

In further embodiments, the local computational device is a first storage controller, and the remote computational device is a second storage controller. The point in time copy operations are performed at the first storage controller to recover the first storage controller to a known state in response to a failure of a batch job in the first storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In an asynchronous copy environment (e.g., a Global Mirror environment) a primary volume at a local site may be asynchronously copied to a secondary volume at a remote site. The remote site may be used for data recovery in the event of a failure of the local site. A point in time copy that uses the secondary volume as a point in time source volume is performed at an opportune time to generate a point in time target volume, where the point in time target volume may be referred to as a journal volume. The journal volume stores consistent data that may be used to make the secondary volume consistent if data recovery is required.

Customers may execute commands to generate point in time local copies of data before running a set of batch jobs at the local site. These point in time copies at the local site may be used to recover back to a previous state at the local site, in case the batch job experiences a failure. The point in time copies at the local site may also be used in test environments. It is desirable to recreate this backup and/or test environment of the local site, into a remote site in a consistent manner.

In case of a disaster on the local site, the remote site may need to recover to the last known consistent copy of data. Certain embodiments describe a recovery process at the remote site in which indicators (referred to as a pending consistency group indicators) are used to identify the point in time copy relationships that are to be restored as part of the recovery to the last known consistent copy of data.

Exemplary Embodiments

Figure 1:
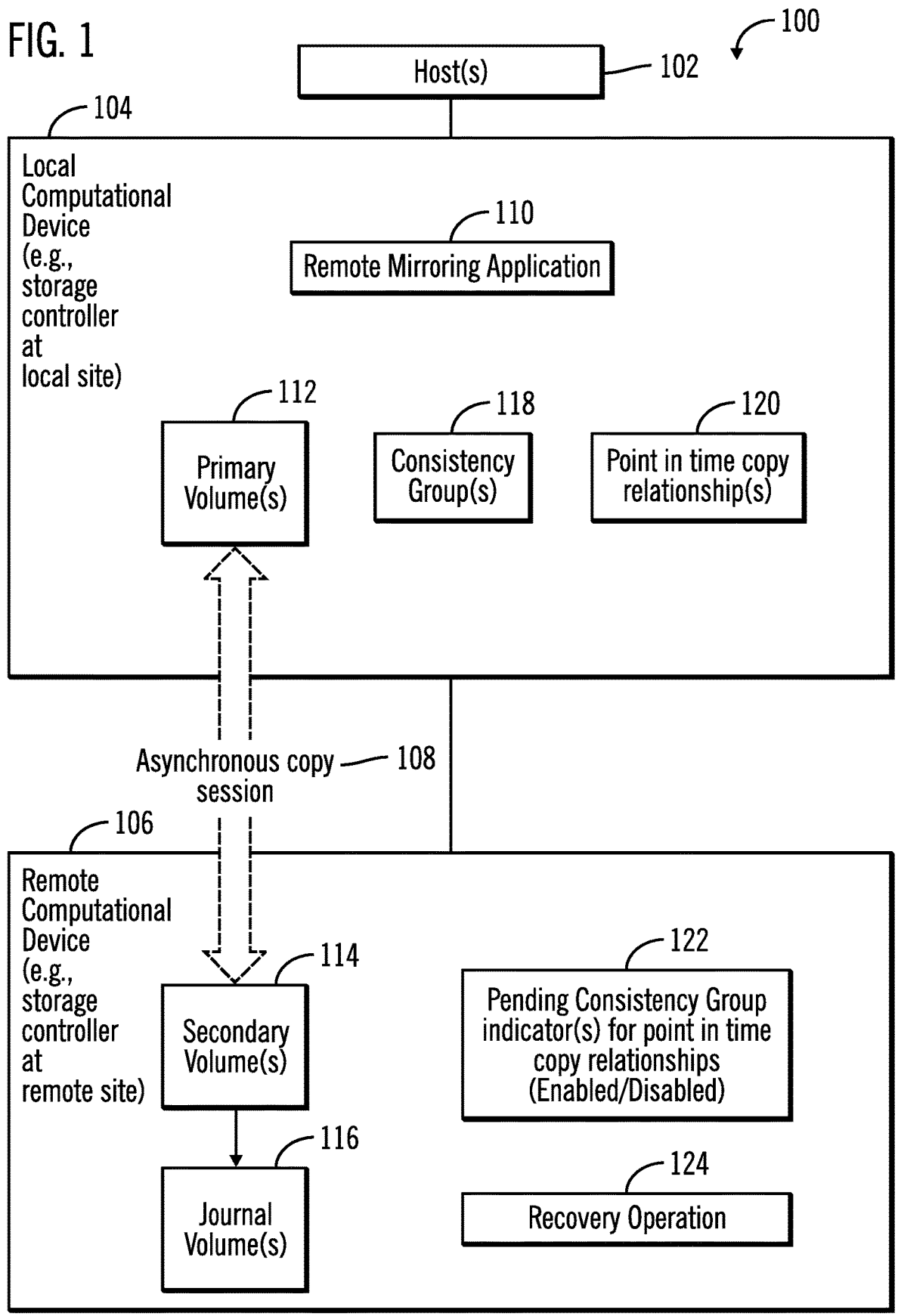
FIG. 1 illustrates a block diagram of a computing environment comprising one or more hosts, a local computational device at a local site, and a remote computational device at a remote site, in accordance with certain embodiments.

FIG. 1 illustrates a block diagram of a computing environment 100 comprising one or more hosts 102, a local computational device 104 at a local site, and a remote computational device 106 at a remote site, where an asynchronous copy session 108 initiated by a remote mirroring application 110 may be used to asynchronously copy data stored in one or more primary volumes 112 controlled by the local computational device 104 to one or more secondary volumes 114 controlled by the remote computational device 106, in accordance with certain embodiments. The data copied to the secondary volumes 114 are copied via a point in time copy operations at an opportune time to journal volumes 116 of the remote computational device 106, where the journal volumes may be used for data recovery in the event of a failure of the local computational device. The journal volumes 116 store consistent data that may be used to make the secondary volume consistent if data recovery is required.

The host 102, the local computational device 104, and the remote computational device 106 may comprise any suitable computational device including those presently known in the art, such as, a personal computer, a workstation, a server, a mainframe, a hand held computer, a palm top computer, a telephony device, a network appliance, a blade computer, a processing device, etc. The host 102, the local computational device 104 and the remote computational device 106 may be elements in any suitable network, such as, a storage area network, a wide area network, the Internet, an intranet, etc. In certain embodiments. In certain embodiments, the host 102, the local computational device 104 and the remote computational device 106 may be elements in a cloud computing environment. The local computational device 104 may be separated from the remote computational device 106 by an extended distance (e.g., over 5 kilometers). The host 102, the local computational device 104, and the remote computational device 106 may each be comprised of one or more computational devices.

In certain embodiments, the local computational device 104 may comprise a storage controller at the local site, where the local computational device 104 may control storage devices and allow one or more of the hosts 102 to perform input/output (I/O) operations on logical storage volumes maintained by the local computational device 104, and where the local computational device 104 also maintains physical storage volumes corresponding to logical storage volumes in the storage devices controlled by the local computational device 104.

The logical storage volumes maintained by the local computational device 104 at the local site may be referred to as primary volumes 112, and logical storage volumes maintained by the remote computational device 106 are referred to as secondary volumes 114. The remote mirroring application 110 that executes in the local computational device 104 may initiate the asynchronous copy session 108. The asynchronous copy session 108 asynchronously starts copying (i.e., replicating) the primary volumes 112 to the remote computational device 106, where the remote computational device 106 maintains the asynchronous copies in logical storage volumes, referred to as secondary volumes 114.

In certain embodiments, write operations that occur to primary volumes 112 while the asynchronous copy session 108 is in progress may cause a lack of synchronization between the primary volumes 112 and the secondary volumes 114. A journal volume 116 is maintained in the remote computational device 106. The journal volume 116 stores the last consistent set of data while the replication occurs between the primary volumes 112 and the secondary volumes 114.

To generate a consistent set of data in the remote computational device 106, the asynchronous copy session 108 performs copies of consistency groups 118 from the local computational device 104 to the remote computational device 106. A consistency group may comprise a collection of volumes or datasets. While the asynchronous copy session 108 is in progress, customers may execute commands to generate point in time local copies of data at the local computational device 104 before running a set of batch jobs at the local computational device 104. These point in time copies at the local computational device 104 may be used to recover back to a previous state at the local computational device 104, in case the batch job experiences a failure. The point in time copies at the local computational device 104 may also be used in test environments. The point in time copy relationships 120 correspond to the point in time copies being generated at the local computational device 104, while the asynchronous copy session 108 to copy consistency groups 118 from the local computational device 104 to the remote computational device 106 is in progress.

In order to recreate this backup and/or test environment of the local computational device 104, into a remote computational device 106 in a consistent manner, while the asynchronous copy session 108 that copies the consistency groups 118 from the local computational device 104 to the remote computational device 106 is in progress, pending consistency group indicators 122 that may be enabled or disabled are maintained at the remote computational device 106. The pending consistency group indicators 122 are used to identify those point in time copy operations that are to be restored as part of a recovery operation 124 performed at the remote computational device 106 in response to a failure of the local computational device 104.

Therefore, FIG. 1 illustrates certain embodiments in which the remote computational device 106 maintains pending consistency group indicators 122 to identify those point in time copy operations that are to be restored as part of a recovery operation 124 performed at the remote computational device 106 in response to a failure of the local computational device 104.

Figure 2:
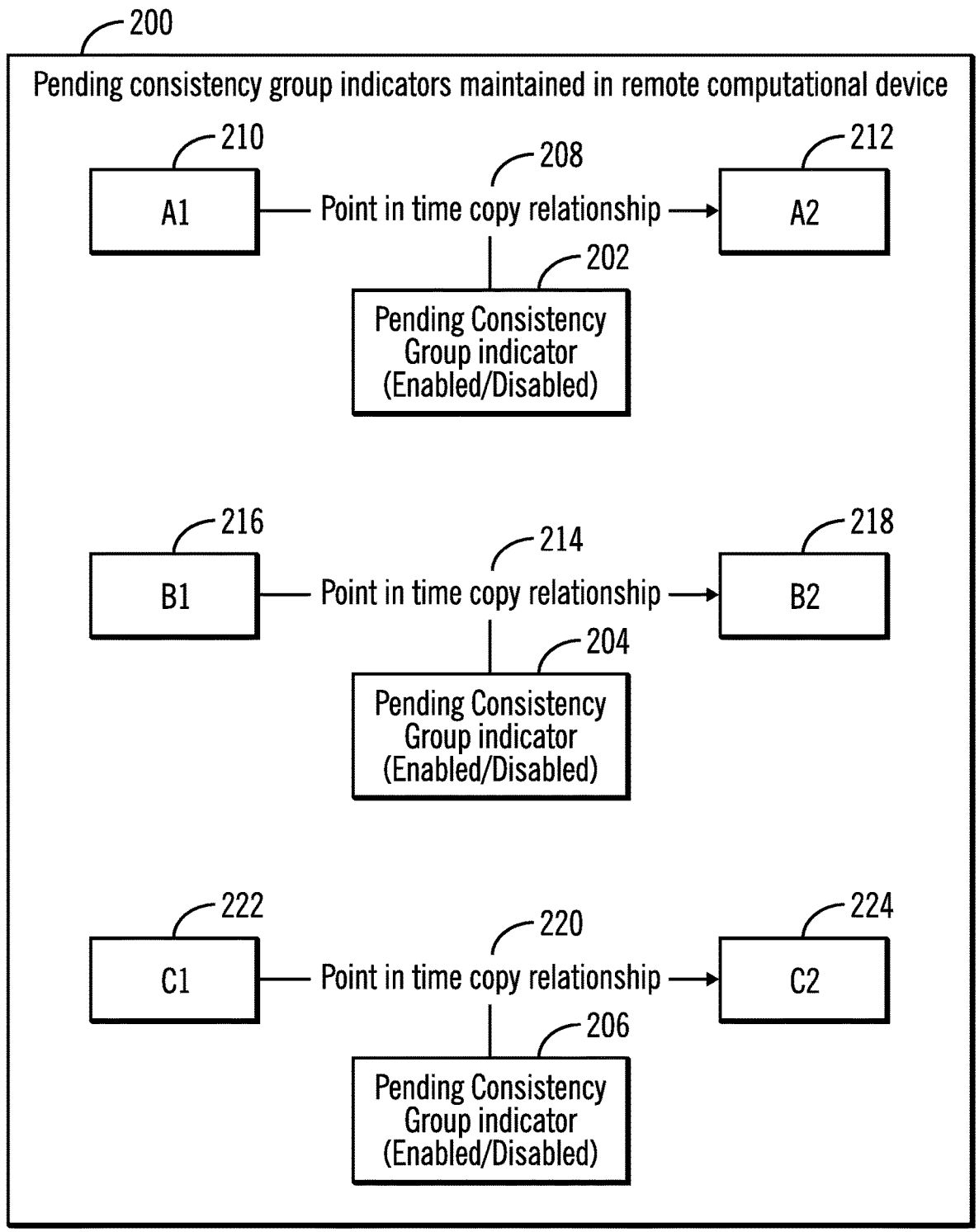
FIG. 2 illustrates a block diagram that shows pending consistency group indicators maintained in the remote computational device, in accordance with certain embodiments.

FIG. 2 illustrates a block diagram 200 that shows exemplary pending consistency group indicators 202, 204, 206 maintained in the remote computational device 106, in accordance with certain embodiments.

The pending consistency group indicator 202 is associated with the point in time copy relationship 208 between data set A1 210 and data set A2 212. The pending consistency group indicator 204 is associated with the point in time copy relationship 214 between data set B1 216 and data set B2 218. The pending consistency group indicator 206 is associated with the point in time copy relationship 220 between data set C1 222 and data set C2 224. In certain embodiments, the point in time copy relationships 208, 214, 220 are established to generate the point in time copies for data sets A1, B1, C1 210, 216, 222 to data sets A2, B2, C2 212, 218, 224 in the local computational device 104.

In certain embodiments, an indication is made that a point in time copy relationship 208, 214, 220 is not part of a consistent copy at the remote computational device 106 as yet, by enabling the pending consistency group indicators 202, 204, 206 at the remote computational device 106 for the corresponding point in time copy relationships 208, 214, 214. If the consistency group has been copied to the remote computational device, then the corresponding pending consistency group indicators 202, 204, 206 are disabled.

Figure 3:
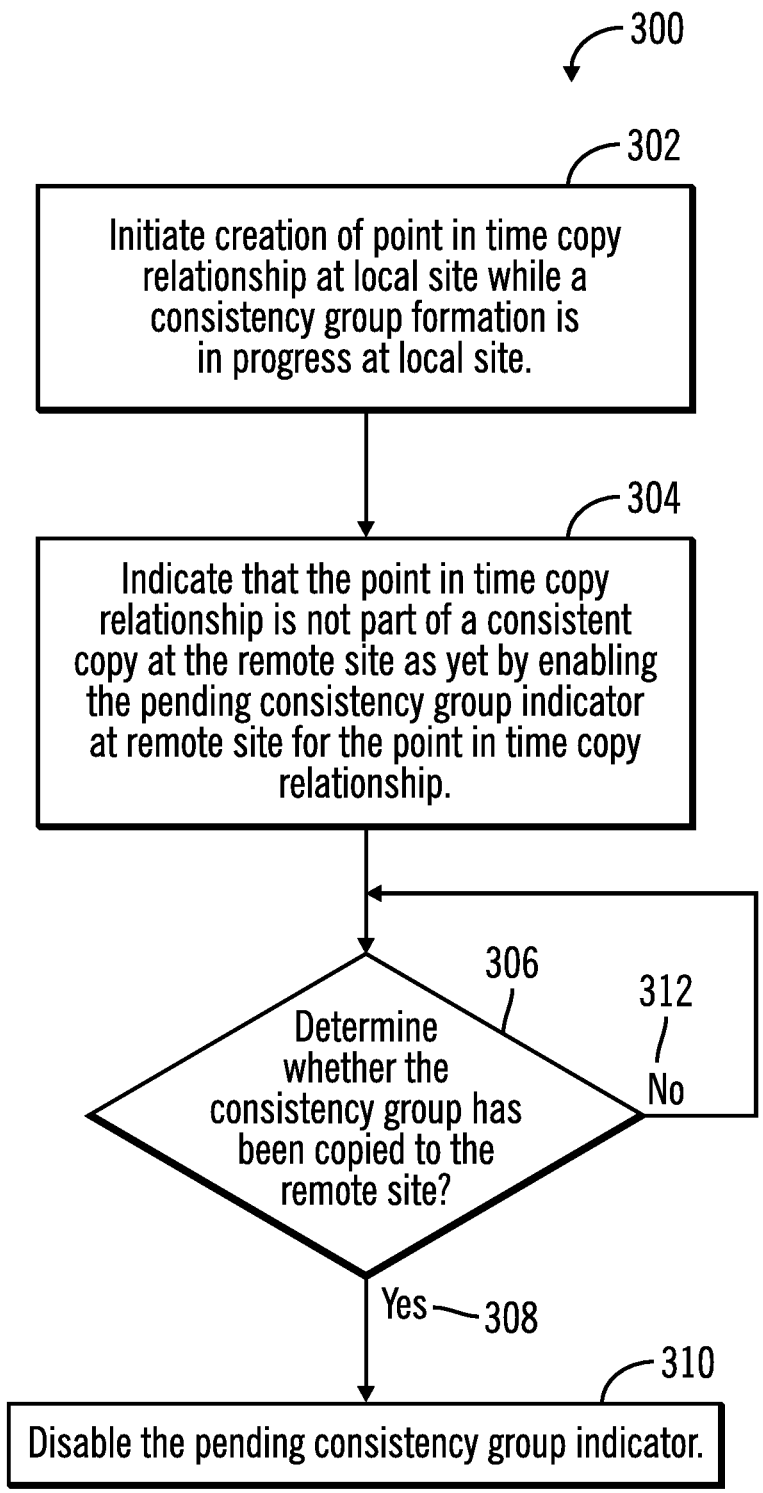
FIG. 3 illustrates a flowchart that shows enablement and disablement of a pending consistency group indicator, in accordance with certain embodiments.

FIG. 3 illustrates a flowchart 300 that shows enablement and disablement of a pending consistency group indicator, in accordance with certain embodiments. The operations shown in FIG. 3 may be performed in the computing environment 100.

Control starts at block 302 in which creation of point in time copy relationship 120 is initiated at the local site 104 (i.e., a site where the local computational device 104 is located) while a consistency group formation to form the consistency group 118 is in progress at the local site 104. An indication is made (at block 304) that the point in time copy relationship 120 is not part of a consistent copy at the remote site 106 (i.e., a site where the remote computational device 106 is located) as yet, by enabling the pending consistency group indicator 122 at the remote site 106 for the point in time copy relationship 120. The enablement of the pending consistency group indicator 122 may be performed by setting the pending consistency group indicator to the Boolean value of true or 1 or via any other mechanism.

From block 304 control proceeds to block 306 in which an application at the remote site 106 determines whether the consistency group 118 has been copied to the remote site 106. If so ("Yes" branch 308) then the pending consistency group indicator 122 is disabled (at block 310). The disablement of the pending consistency group indicator 122 may be performed by setting the pending consistency group indicator to the Boolean value false or 0 or via any other mechanism.

If at block 306, the application at the remote site 106 determines that the consistency group 118 has not been copied to the remote site 106 ("No" branch 312), then control returns once again to block 306 where it is determined once again as to whether the whether the consistency group 118 has been copied to the remote site 106.

Figure 4:
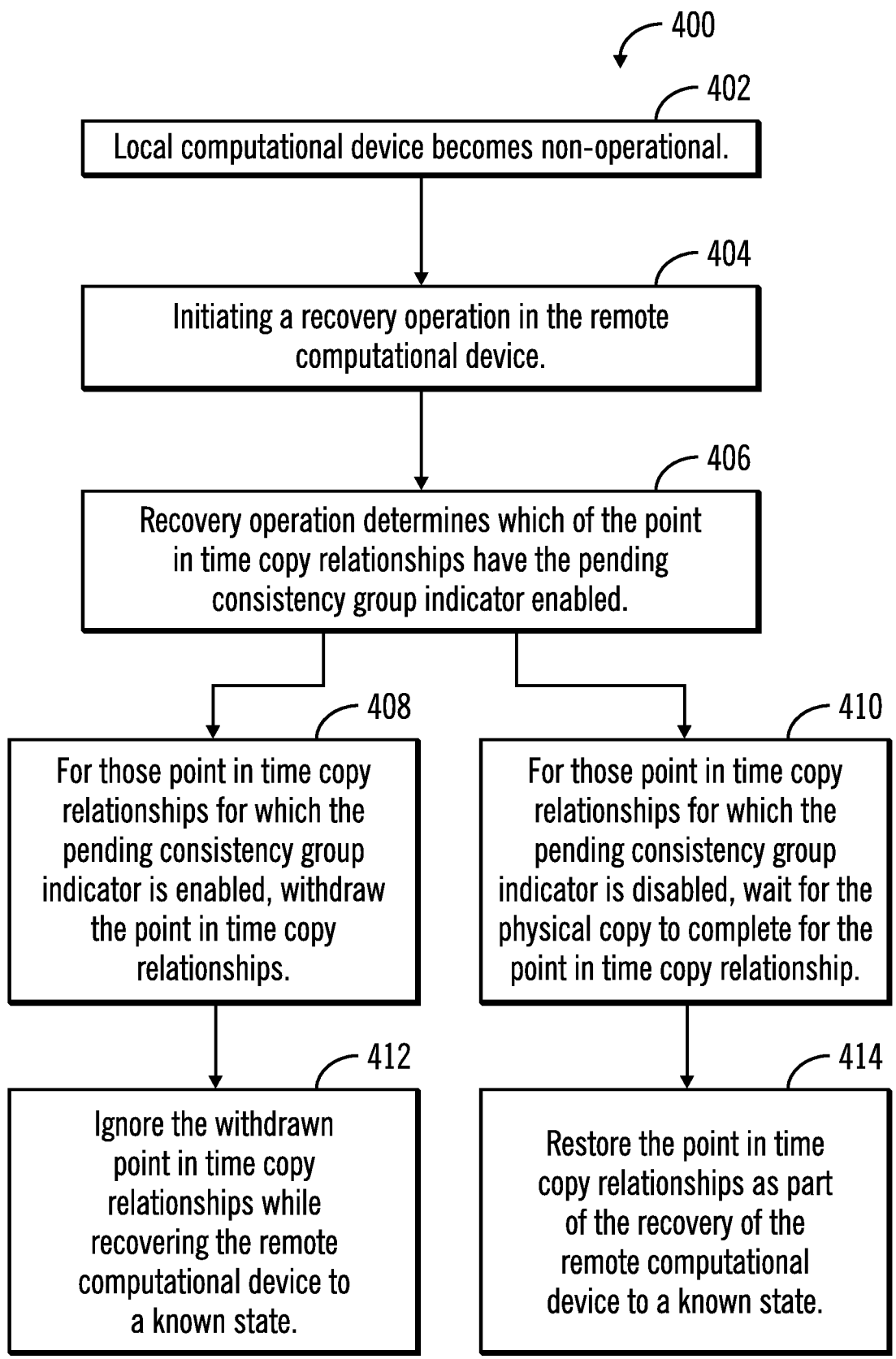
FIG. 4 illustrates a flowchart that shows recovery operations and restoration of point in time copy operations, in accordance with certain embodiments.

FIG. 4 illustrates a flowchart 400 that shows recovery operations and restoration of point in time copy relationships, in accordance with certain embodiments. The operations shown in FIG. 4 may be performed at the remote computational device 106.

Control starts at block 402 in which the remote computational device 106 determines that the local computational device 104 has become non-operational. In response to determining the local computational device 104 has become non-operational, the remote computational device 106 initiates (at block 404) the recovery operation 124 in the remote computational device 106.

From block 404, control proceeds to block 406 in which the recovery operation 124 determines which of a plurality of point in time copy relationships 120, 202, 204, 206 have corresponding pending consistency group indicators 122, 202, 204, 206 enabled.

From block 406 control proceeds in parallel to block 408 and block 410.

At block 410, the point in time copy relationships are withdrawn for those point in time copy relationships for which consistency group indicators are enabled. The performing of the point in time copy relationships that are withdrawn is avoided (at block 412) while recovering the remote computational device 106 to a known state, where the known state corresponds to a state in which consistent data has been copied to the remote computational device 106.

At block 410, a waiting is performed for physical copy to complete for those point in time copy relationships for which consistency group indicators are disabled. The point in time copy relationships are restored (at block 414) while recovering the remote computational device to a known state, where the known state corresponds to a state in which consistent data has been copied to the remote computational device 106.

Therefore, in certain embodiments described in FIG. 4, the pending consistency group indicators are used to determine whether or not to recreate point in time copy operations of the local computational device 104 at the remote computational device 106.

Figure 5:
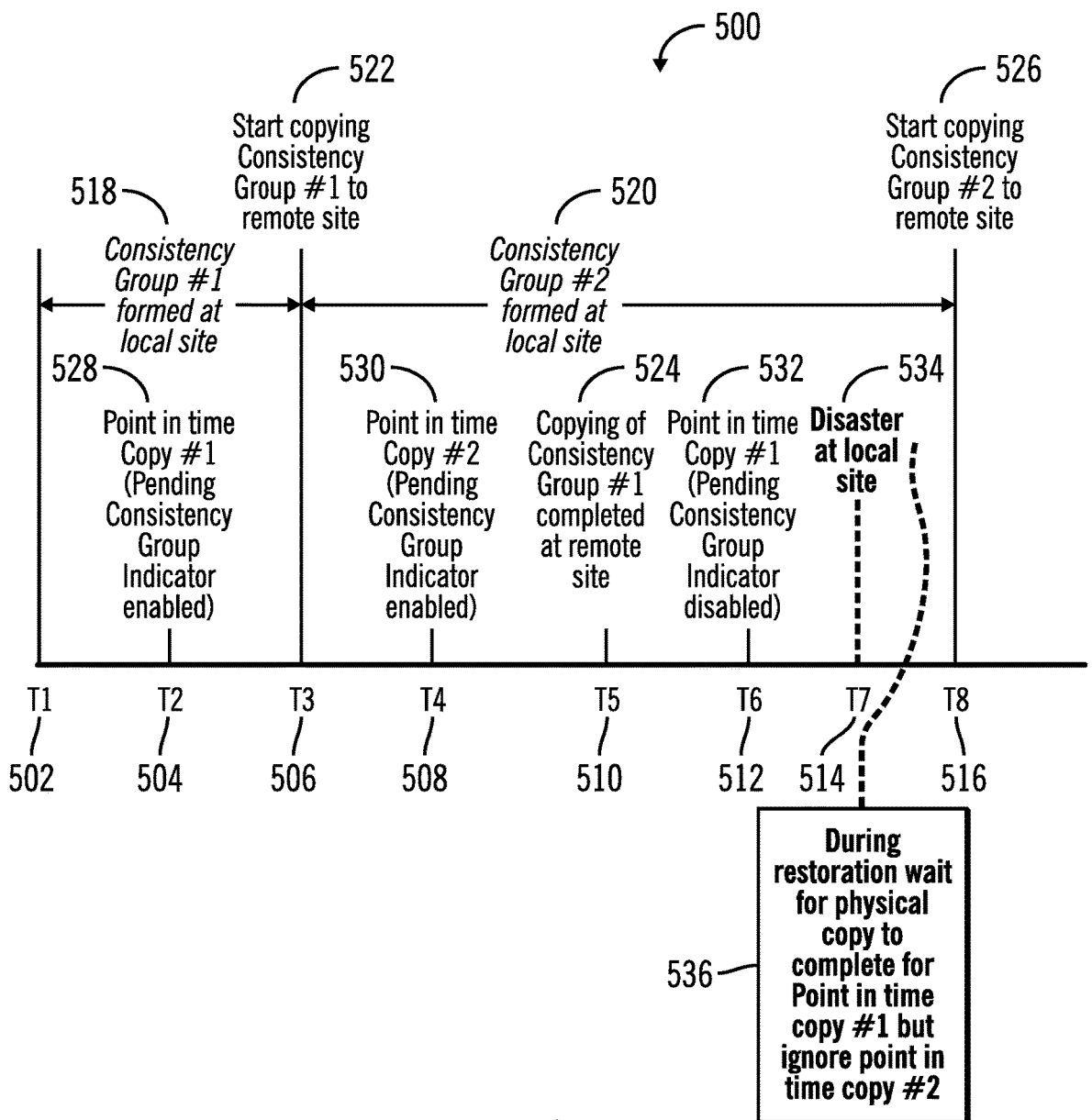
FIG. 5 illustrates a block diagram that shows an example in which the recovery operation waits for physical copy to complete for a first point in time copy operation but ignores a second point in time copy operation, in accordance with certain embodiments.

FIG. 5 illustrates a block diagram 500 that shows an example in which the recovery operation 124 waits for physical copy to complete for a first point in time copy operation but ignores (i.e., avoids performing) a second point in time copy operation, in accordance with certain embodiments.

In FIG. 5, exemplary operations performed at times T1, T2, T3, T4, T5, T6, T7, T8 502, 504, 506, 508, 510, 512, 514, 516 are shown. Consistency group #1 is formed at the local site 104 between time T1 502 and T3 506 (as shown via reference numeral 518), and consistency group #2 is formed at the local site 104 between the time T3 506 and T8 516 (as shown via reference numeral 520).

At time T3 506, the consistency group #1 starts getting copied to the remote site 106 (as shown via reference numeral 522). The copying of the consistency group #1 is completed at the remote site 106 at time T5 510 (as shown via reference numeral 524). The consistency group #2 formed at the local site 104 starts getting copied at time T8 516 to the remote site 106 (as shown via reference numeral 526).

At time T2 504, the pending consistency group indicator corresponding to a point in time copy #1 is enabled (as shown via reference numeral 528). At time T4 508, the pending consistency group indicator corresponding to a point in time coy #2 is enabled (as shown via reference numeral 530).

At time T6 512 the pending consistency group indicator corresponding to a point in time copy #1 is disabled (at shown via reference numeral 532) as the copying of consistency group #1 is complete at the remote site 106.

If a disaster strikes at the local site 104 (i.e., the local site 104 becomes non-operational) at time T7 514 (as shown via reference numeral 534), then during restoration of data, the recovery operation 124 waits for physical copy to complete for point in time copy #1 but ignores (i.e., avoids performing) point in time copy #2 (as shown via reference numeral 536). The physical copying completes the logical point in time copy relationship that may have been established earlier.

Therefore, FIG. 5 illustrates certain embodiments in which the point in time copy operations on consistency groups that have been copied to the remote site 106 are recreated at the remote site 106, whereas the point in time copies on consistency groups that have not been copied to the remote site 106 not performed.

Figure 6:
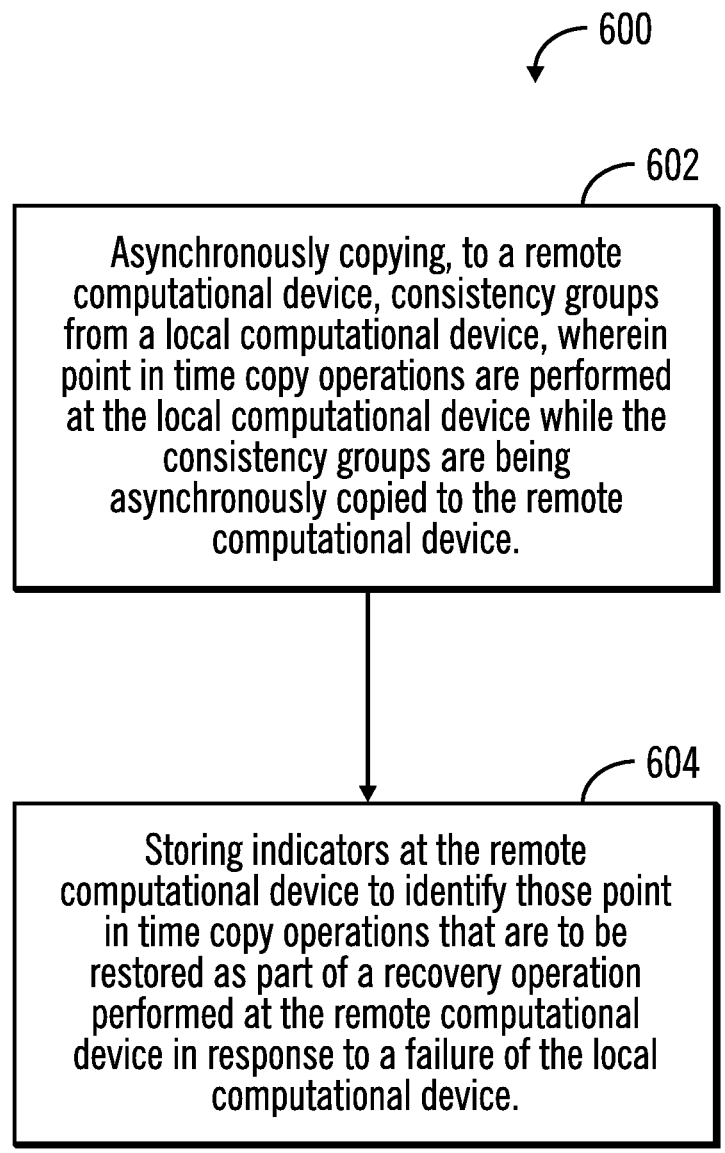
FIG. 6 illustrates a flowchart that shows certain operations for restoration of data when point in time copies are performed at a local site during an asynchronous copy to a remote site, in accordance with certain embodiments.

FIG. 6 illustrates a flowchart 600 that shows certain operations for restoration of data when point in time copies are performed at a local site 104 during an asynchronous copy to a remote site 106, in accordance with certain embodiment. The operations shown in FIG. 6 may be performed in the computing environment 100.

Control starts at block 602, in which consistency groups 118 are asynchronously copied to a remote computational device 106, from a local computational device 104, wherein point in time copy operations are performed at the local computational device 104 while the consistency groups 118 are being asynchronously copied to the remote computational device 106.

From block 602 control proceeds to block 604 in which indicators 122 are stored at the remote computational device 1106 to identify those point in time copy operations that are to be restored as part of a recovery operation 124 performed at the remote computational device 106, in response to a failure of the local computational device 104.

Therefore FIG. 1-6 illustrate certain embodiments in which pending consistency group indicators 122 maintained at the remote computational device 106 are used to determine which point in time copy operations on consistency groups are to be recreated at the remote computational device 106, when the point in time copy operations may occur in the local computational device 104 while the consistency groups are being copied from the local computational device 104 to the remote computational device 106.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
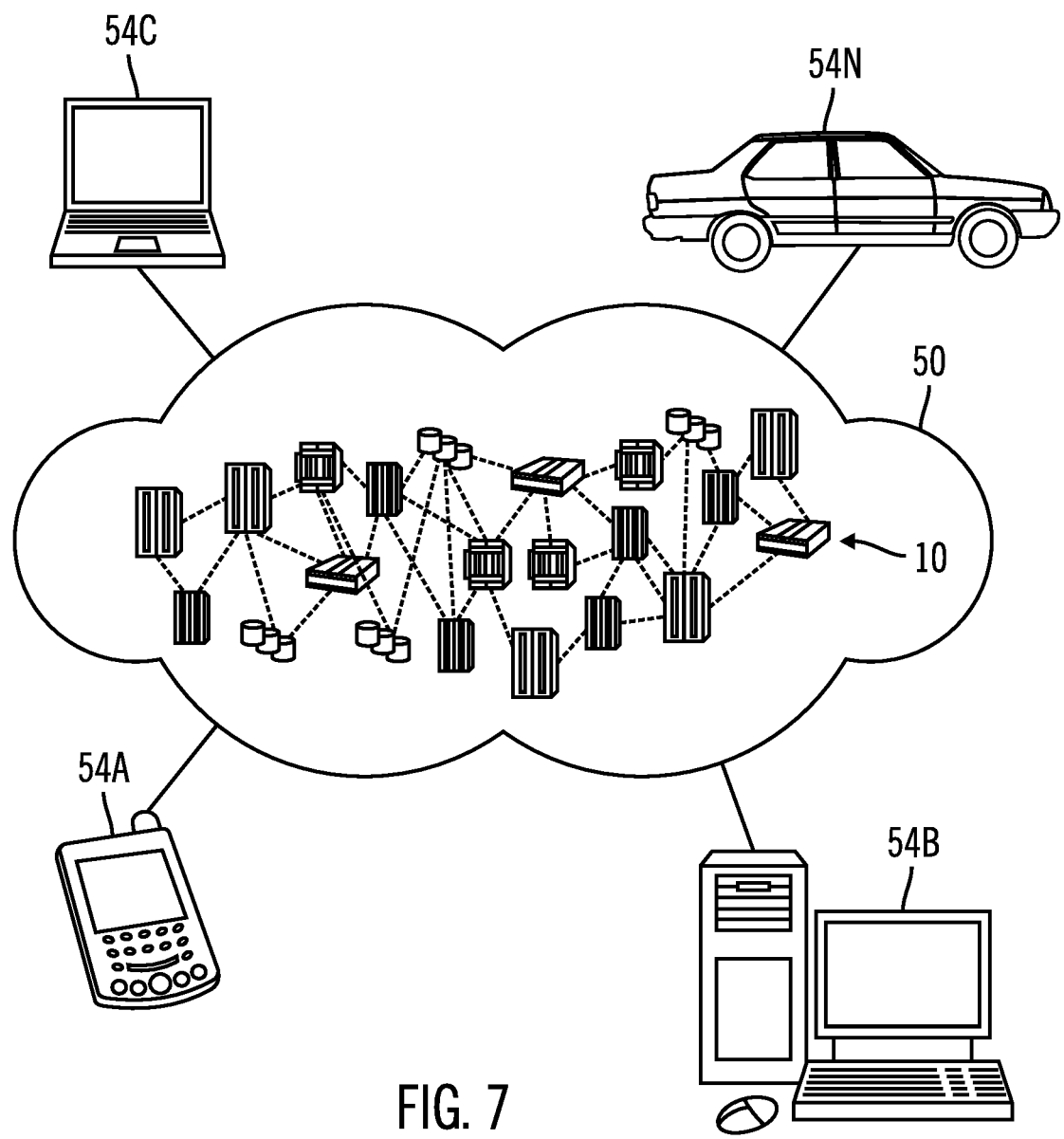
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
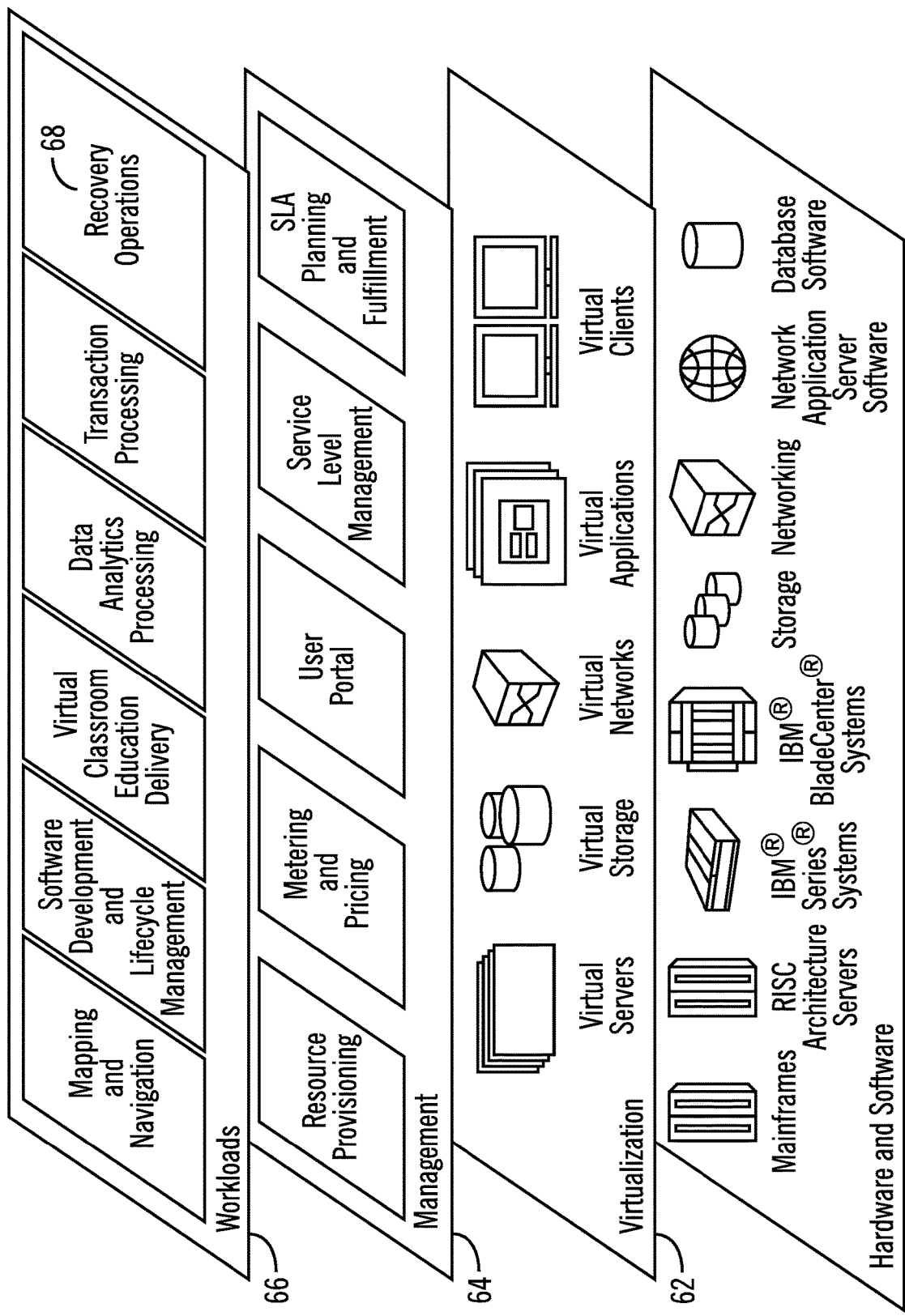
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and recovery operations 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
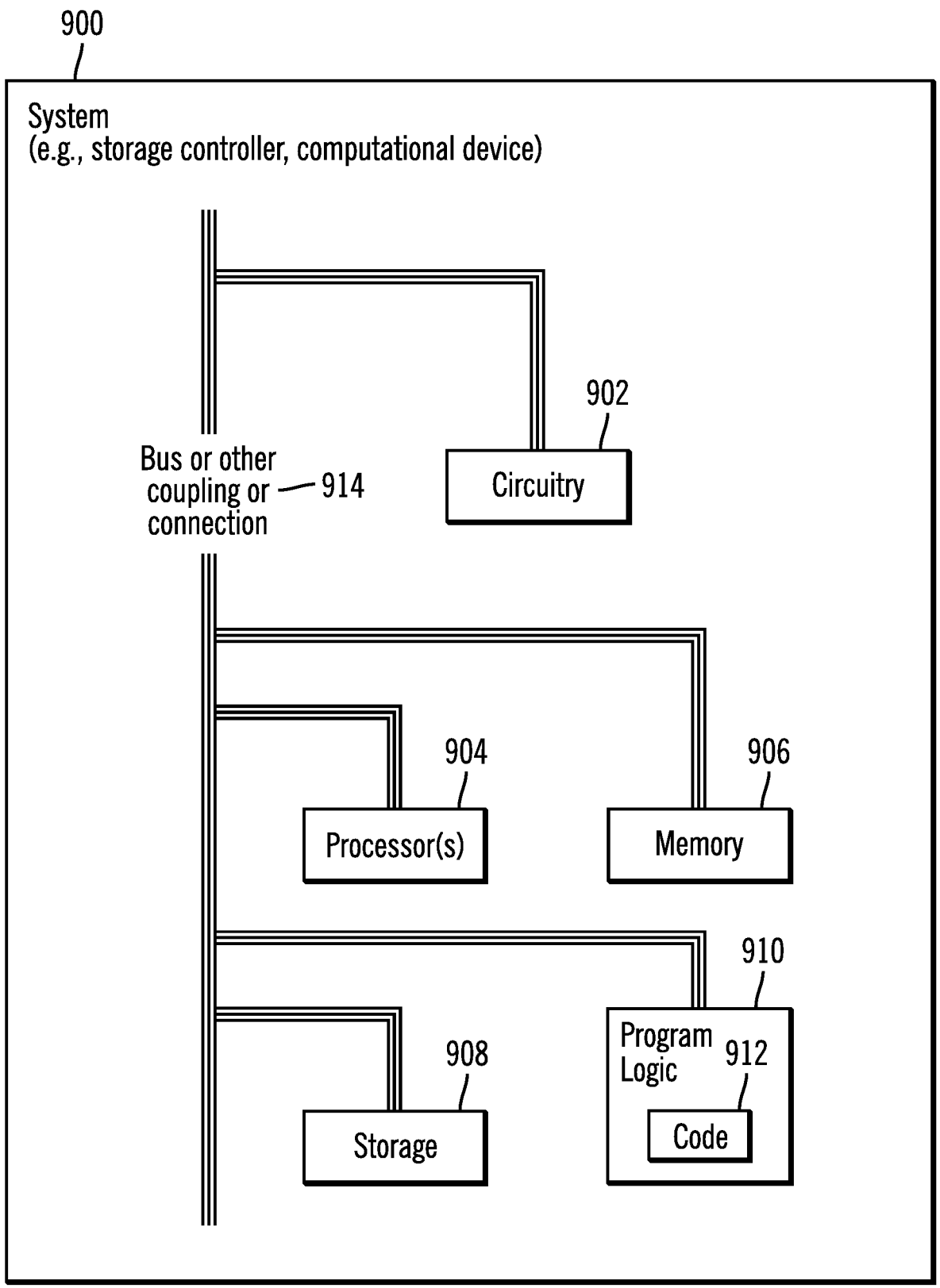
FIG. 9 illustrates a block diagram of a computational system that shows certain elements that may be included in the local and remote computational devices, as described in FIGS. 1-8, in accordance with certain embodiments.

FIG. 9 illustrates a block diagram that shows certain elements that may be included in the local computational device 104, the remote computational device 106, the hosts 102, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
concurrently performing point in time copy operations at a local computational device and asynchronous copy of consistency groups to a remote computational device; and
storing indicators at the remote computational device to identify those point in time copy operations that are to be restored as part of a recovery operation performed at the remote computational device, wherein the point in time copy operations are performed at the local computational device to recover the local computational device to a known state in response to a failure of a batch job in the local computational device.

2. The method of claim 1, wherein:
the local computational device is a first storage controller; and
the remote computational device is a second storage controller.

3. A method, comprising:
concurrently performing point in time copy operations at a local computational device and asynchronous copy of consistency groups to a remote computational device; and
storing indicators at the remote computational device to identify those point in time copy operations that are to be restored as part of a recovery operation performed at the remote computational device, wherein each of the indicators is a pending consistency group indicator, the method further comprising:
initiating creation of a point in time copy relationship at the local computational device while formation of a consistency group is in progress at the local computational device; and
indicating that the point in time copy relationship is not part of a consistent copy at the remote computational device as yet by enabling the pending consistency group indicator at the remote computational device for the point in time copy relationship.

4. The method of claim 3, the method further comprising:
determining whether the consistency group has been copied to the remote computational device; and
in response to determining that the consistency group has been copied to the remote computational device, disabling the pending consistency group indicator.

5. The method of claim 4, the method further comprising:
in response to determining the local computational device has become non-operational, initiating the recovery operation in the remote computational device; and
determining, by the recovery operation, which of a plurality of point in time copy relationships have corresponding pending consistency group indicators enabled.

6. The method of claim 5, the method further comprising:
withdrawing the point in time copy relationships for those point in time copy relationships for which consistency group indicators are enabled; and
avoiding performing the point in time copy relationships that are withdrawn while recovering the remote computational device to a known state.

7. The method of claim 5, the method further comprising:
waiting for physical copy to complete for those point in time copy relationships for which consistency group indicators are disabled; and
restoring the point in time copy relationships while recovering the remote computational device to a known state.

8. A system comprising a remote computational device, wherein the remote computational device is coupled to a local computational device, the system comprising:
a memory; and
a processor coupled to the memory, wherein the processor performs operations, the operations comprising:
concurrently performing point in time copy operations at a local computational device and asynchronous copy of consistency groups to a remote computational device; and
storing indicators at the remote computational device to identify those point in time copy operations that are to be restored as part of a recovery operation performed at the remote computational device, wherein the point in time copy operations are performed at the local computational device to recover the local computational device to a known state in response to a failure of a batch job in the local computational device.

9. The system of claim 8, wherein:
the local computational device is a first storage controller; and
the remote computational device is a second storage controller.

10. A system comprising a remote computational device, wherein the remote computational device is coupled to a local computational device, the system comprising:
a memory; and
a processor coupled to the memory, wherein the processor performs operations, the operations comprising:
concurrently performing point in time copy operations at a local computational device and asynchronous copy of consistency groups to a remote computational device; and
storing indicators at the remote computational device to identify those point in time copy operations that are to be restored as part of a recovery operation performed at the remote computational device, wherein each of the indicators is a pending consistency group indicator, the operations further comprising:
initiating creation of a point in time copy relationship at the local computational device while formation of a consistency group is in progress at the local computational device; and
indicating that the point in time copy relationship is not part of a consistent copy at the remote computational device as yet by enabling the pending consistency group indicator at the remote computational device for the point in time copy relationship.

11. The system of claim 10, the operations further comprising:
- determining whether the consistency group has been copied to the remote computational device; and
- in response to determining that the consistency group has been copied to the remote computational device, disabling the pending consistency group indicator.

12. The system of claim 11, the operations further comprising:
- in response to determining the local computational device has become non-operational, initiating the recovery operation in the remote computational device; and
- determining, by the recovery operation, which of a plurality of point in time copy relationships have corresponding pending consistency group indicators enabled.

13. The system of claim 12, the operations further comprising:
- withdrawing the point in time copy relationships for those point in time copy relationships for which consistency group indicators are enabled; and
- avoiding performing the point in time copy relationships that are withdrawn while recovering the remote computational device to a known state.

14. The system of claim 12, the operations further comprising:
- waiting for physical copy to complete for those point in time copy relationships for which consistency group indicators are disabled; and
- restoring the point in time copy relationships while recovering the remote computational device to a known state.

15. A computer program product, the computer program product comprising a computer readable storage medium having computer readable program code embodied therewith, the computer readable program code configured to perform operations on a processor, the operations comprising:
- concurrently performing point in time copy operations at a local computational device and asynchronous copy of consistency groups to a remote computational device; and
- storing indicators at the remote computational device to identify those point in time copy operations that are to be restored as part of a recovery operation performed at the remote computational device, wherein the point in time copy operations are performed at the local computational device to recover the local computational device to a known state in response to a failure of a batch job in the local computational device.

16. The computer program product of claim 15, wherein:
- the local computational device is a first storage controller; and
- the remote computational device is a second storage controller.

17. A computer program product, the computer program product comprising a computer readable storage medium having computer readable program code embodied therewith, the computer readable program code configured to perform operations on a processor, the operations comprising:
- concurrently performing point in time copy operations at a local computational device and asynchronous copy of consistency groups to a remote computational device; and
- storing indicators at the remote computational device to identify those point in time copy operations that are to be restored as part of a recovery operation performed at the remote computational device, wherein each of the indicators is a pending consistency group indicator, the operations further comprising:
  - initiating creation of a point in time copy relationship at the local computational device while formation of a consistency group is in progress at the local computational device; and
  - indicating that the point in time copy relationship is not part of a consistent copy at the remote computational device as yet by enabling the pending consistency group indicator at the remote computational device for the point in time copy relationship.

18. The computer program product of claim 17, the operations further comprising:
- determining whether the consistency group has been copied to the remote computational device; and
- in response to determining that the consistency group has been copied to the remote computational device, disabling the pending consistency group indicator.

19. The computer program product of claim 18, the operations further comprising:
- in response to determining the local computational device has become non-operational, initiating the recovery operation in the remote computational device; and
- determining, by the recovery operation, which of a plurality of point in time copy relationships have corresponding pending consistency group indicators enabled.

20. The computer program product of claim 19, the operations further comprising:
- withdrawing the point in time copy relationships for those point in time copy relationships for which consistency group indicators are enabled; and
- avoiding performing the point in time copy relationships that are withdrawn while recovering the remote computational device to a known state.

* * * * *